United States Patent [19]

Stigler

[11] 3,900,570

[45] Aug. 19, 1975

[54] FERMENTATION ADJUVANT FOR YEAST LEAVENED BREAD PROCESSES

[75] Inventor: Edward A. Stigler, Palos Heights, Ill.

[73] Assignee: Walter M. Christensen, Milwaukee, Wis. ; a part interest

[22] Filed: Oct. 23, 1973

[21] Appl. No.: 408,551

Related U.S. Application Data

[63] Continuation-in-part of Ser. No. 185,445, Sept. 30, 1971, abandoned.

[52] U.S. Cl. .................... 426/9; 426/24; 426/97; 426/151; 426/226; 426/335; 426/342
[51] Int. Cl.² .. A21D 2/02; A21D 2/04; A21D 2/16; A21D 2/22
[58] Field of Search .............. 426/9, 24, 25, 26, 97, 426/151, 226, 342, 335

[56] References Cited

UNITED STATES PATENTS

| | | | |
|---|---|---|---|
| 2,903,361 | 9/1959 | Marks et al. | 426/26 |
| 2,970,915 | 2/1961 | Ferrari | 426/24 X |
| 2,971,845 | 2/1961 | Ferrari | 426/24 X |
| 2,997,394 | 8/1961 | Melnick et al. | 426/9 |
| 3,065,080 | 11/1962 | Melnick et al. | 426/9 |
| 3,433,645 | 3/1969 | Egan et al. | 426/24 |
| 3,494,770 | 2/1970 | Smerak et al. | 426/26 X |

*Primary Examiner*—James R. Hoffman

[57] ABSTRACT

Yeast leavened bread having improved characteristics is prepared by adding a premixed fermentation adjuvant, including a glyceride emulsifier, yeast nutrients, oxidizing agents and other conventional additives, such as salt, calcium sulphate and/or monocalcium phosphate, calcium propionate and/or sodium propionate mold inhibitors, and fillers such as wheat and/or corn flours, as a single charge to the dough mixture. The adjuvant can be added along with the yeast and other basic bread-making ingredients during the initial dough or brew mixing phase, thereby eliminating the heretofore standard procedure of adding numerous ingredients at various stages of dough mixing phases. In addition to eliminating various scaling procedures for each of the ingredients replaced thereby, the adjuvant is effective in reducing the normal fermentation period, reducing mixing cycles, and decreasing the pan-proofing period.

16 Claims, No Drawings

3,900,570

FERMENTATION ADJUVANT FOR YEAST LEAVENED BREAD PROCESSES

CROSS-REFERENCE TO RELATED APPLICATION

This application is a continuation-in-part of application Ser. No. 185,445, filed Sept. 30, 1971 and now abandoned.

BACKGROUND OF THE INVENTION

This invention relates to an improved process for making yeast leavened bread. In the commercial production of yeast leavened bread, a variety of additives are included in the dough formulation in addition to the basic ingredients — flour, water, sweetner, yeast and salt. These additives are used to improve processability of the dough and to impart various characteristics to the baked product. Typical additives of this type include yeast nutrients to increase yeast activity and thereby increase product volume, oxidizing agents to improve dough stability and improve grain and texture of the product, dough conditioning and strengthening agents to improve dough stability and processability of the dough, emulsifiers to increase softness and improve shelf life of the product, fungal enzymes to reduce mixing periods and improve machinability, mold inhibitors to inhibit growth of mold, bacteria, and other microorganisms that impair shelf life and flavor of the product, calcium peroxide to bleach and whiten the grain of the bread and vitamin enrichment additives.

In current commercial processes, yeast nutrients, oxidizing agents, emulsifiers, dough conditioners, fungal enzymes, mold inhibitors, and whiteners are individually scaled and added to the mixing process in separate and time-consuming steps. Thus, the baker is required to perform these functions separately and thereby bring about a certain scaling cost factor which influences the direct labor percentage of the unit cost. He is also compelled to add these ingredients to the dough mixing process in various stages to avoid certain undesirable reactions between the yeast and the additives.

The two most widely used commercial processes for making yeast leavened bread are the sponge dough process and the continuous process. In the sponge dough process, a sponge batch is initially prepared by admixing a portion of the basic ingredients and some of the additives. This sponge batch is allowed to ferment for 4 ½ to 5 hours and is then mixed with the remaining ingredients and additives prior to baking. Typically, the sponge batch is formed by mixing together about 60 to 70% of the flour, about 40% of the water, all of the yeast and all the yeast food. After being allowed to ferment for about 4 ½ to 5 hours, the sponge batch is remixed with the remaining portions of the flour, water and other ingredients, such as sugar, salt, milk, fat, and additives, such as mold inhibitor, emulsifier and vitamin enrichment additives. The dough is allowed to relax in troughs for several minutes and is then divided, rounded, intermediately proofed, molded into designated shapes, panned, final proofed and baked.

In the continuous process, a liquid brew is prepared by mixing most or all of the water, a large portion of the flour, all of the yeast and all the yeast food. A major portion of the fermentation takes place in the brew. The brew is then transferred to a second mixer wherein it is mixed with other bread making ingredients, including fat, sugar, salt, and the remainder of the flour. The remaining additives are usually either added to the brew just prior to its transfer into the second mixer or introduced into the dough at some stage of development from a separate tank. After the dough is formed and developed in the second mixer, it is divided and thereafter handled in a conventional manner, such as rounding, molding, panning, intermediate proofing, molding, and/or panning, final proofing, and baking.

Modern day demand for dough handling characteristics, reduced fermentation periods, over-all bread quality and extended shelf-like has resulted in many additives i.e., yeast food, strengtheners, softeners, enzymes, oxidants, mold inhibitors, whitening agents, and vitamins, becoming standard ingredients in bread formulas, and separate steps for the addition of these compounds are utilized in all dough mixing procedures.

Furthermore, many of these compounds are used in a fine, powdered form and dust very badly during handling. Consequently, the baker is plagued with a nasty dusting problem, both during the scaling operation and the incorporation of these compounds into the dough. The degree of dusting is sometimes so severe that operators are required to wear respiratory masks. In addition to the undesirability of dust-covered floors and equipment, steps must be taken to insure the powder does not get into the moving mechanisms of various surrounding equipment because of the potential gumming problem produced thereby.

SUMMARY OF THE INVENTION

An object of this invention is to provide an improved process for making yeast leavened bread whereby all, or substantially all, of the additives are added in a single step to the dough batch prior to fermentation.

Another object of this invention is to provide a fermentation adjuvant, which can be added directly to a yeast leavened dough during the initial mixing step of the process and which increases the activity of the yeast and thereby reduces fermentation time.

Other objects, aspects, and advantages of the invention will become apparent upon reviewing the following detailed description and the appended claims.

In accordance with the invention, accelerated yeast fermentation and a bread having improved uniformity in volume, break and shred and crust characteristics is produced by the addition of an adjuvant comprised of a blended mixture of an emulsifying agent, a yeast nutrient and an oxidizing agent. The adjuvant is added to a bread making process along with the yeast and other basic bread making ingredients during the initial dough making step prior to substantial fermentation. It has been found that the use of the adjuvant of the invention produces a significant acceleration of the yeast activity thereby permitting the fermentation time to be reduced substantially.

When protection against mold is desired, a mold inhibitor selected from the group consisting of calcium propionate, sodium propionate and mixtures thereof can be advantageously included in the adjuvant. In order to preclude an undesirable increase in fermentation time, the usual practice has been to separately add these mold inhibitors to the dough sometime after a large portion of the fermentation or cell development has taken place. Quite unexpectedly, it has been found that, when these mold inhibitors are incorporated into the adjuvant of the invention in the total quantity required to provide long term mold inhibition, the beneficial accelerated fermentation rate provided by the adjuvant is increased even further in most cases.

The powdered portion of the adjuvant is intermixed with the emulsifying agent so there is little or no dusting storage during handling and incorporation of the adjuvant into the dough. Thus, all the dough forming additives to be added to the basic bread ingredients can be premixed in the appropriate proportions for the particular dough unit being made and added as a single charge to the process in a single step. The expense, time and effort associated with the separate addition of certain of the dough additives are eliminated. Also, problems associated with dusting are eliminated.

If desired, fillers or dough conditioning agents commonly used in so-called yeast food compositions can be blended with the basic ingredients of the adjuvant of the invention.

DESCRIPTION OF THE PREFERRED EMBODIMENTS

The emulsifying agent used in the adjuvant of the invention can be any fat having the capability of improving the shelf life of the bread and physically tying up and at least partially encapsulating the yeast nutrient and the oxidizing agent when blended therewith. As used herein, the term "fat" includes esters and mixtures of esters of glycerol of higher fatty acids (both saturated and unsaturated) including mono-, di-, and triesters of glycerol. The preferred emulsifying agents are selected from the group consisting of calcium and sodium stearyl-2-lactylate, mono- and diglycerides (i.e., the transesterification products of glycerine and edible fats and oils), ethoxylated monoglycerides (such as those described in U.S. Pat. No. 3,433,645), and mixtures thereof. At present, the preferred emulsifying agent is a mixture of mono- and diglycerides and ethoxylated monoglycerides containing about 40% by weight of oxyethylated monoglycerides, with the ethylene oxide comprising about 50% by weight thereof, and about 60% by weight of a mixture of non-ethoxylated mono- and digylcerides.

The emulsifying agent is preferably powdered to facilitate blending but can also be liquid or hydrated into a plastic (lard-like) form so long as the other basic ingredients of the adjuvant, i.e., the yeast nutrient and the oxidizing agent, are physically tied up with and at least partially encapsulated by the emulsifying agent.

The yeast nutrient used in the adjuvant of the invention are ammonium compounds which provide nitrogen for the yeast cells. The useful ammonium compounds are salts of hydrochloric, sulfuric and phosphoric acids. The preferred yeast nutrients are ammonium chloride, ammonium sulfate, mono- ammonium phosphate, di- ammonium phosphate and mixtures thereof, with ammonium sulfate being the most preferred.

The oxidizing agent used in the adjuvant of the invention is selected from the group consisting of potassium bromate, potassium iodate, calcium bromate, calcium iodate, ammonium persulfate, L-ascorbic acid, azodicarbonamide, and mixtures thereof. The preferred oxidizing agents are potassium bromate, potassium iodate and mixtures thereof with potassium bromate being the most preferred.

As mentioned above, when protection against mold is desired in the final baked product, a mold inhibitor selected from the group consisting of calcium propionate, sodium propionate and mixtures thereof can be included in the adjuvant of the invention. At present, calcium propionate is the most preferred mold inhibitor. Instead of reducing the rate of fermentation as would be expected, it has been found that the inclusion of such a mold inhibitor in the adjuvant of the invention further increases the rate of fermentation in some cases.

Fillers or dough conditioners commonly used in so-called yeast food compositions can be advantageously included in the adjuvant of the invention. Representative examples of suitable fillers or dough conditioners include flour (wheat and/or corn) starch, calcium sulfate, sodium chloride (salt), mono-, di- and tricalcium phosphates, calcium lactate, calcium carbonate, calcium mono- and triorthophosphates, and mixtures thereof. In order to provide a source of calcium to the bread, it is generally preferred to include one of the above calcium salts as the filler or a part of the filler when a mixture of filler materials are used. At present the preferred fillers or dough conditioners are flour, starch, sodium chloride, calcium sulfate and mixtures thereof.

If desired, various vitamin enrichment agents, such as niacin, thiamine, riboflavin, iron, etc., and sweeteners, such as dextrose, sucrose, etc., can also be included in the adjuvant.

The proportions of each ingredient used in the adjuvant of the invention is largely dependent upon the specific characteristics desired in the final baked product. For instance, when a more porous bread is desired, larger amounts of the yeast nutrient and the oxidizing agent is used. The broad and preferred ranges by weight percentage of the ingredients of the adjuvant are listed below in Table A.

TABLE A

| Ingredient | Weight %, Based on Total Weight of Adjuvant | |
|---|---|---|
| | Broad Range | Preferred Range |
| Emulsifying agent | 10 to 90 | 35 to 45 |
| Yeast nutrient | .025 to 10 | 5 to 7 |
| Oxidizing agent | .001 to 0.75 | 0.10 to 15 |
| Mold inhibitor | 0 to 20 | 5 to 10 |
| Filler | 0 to 85 | 30 to 48 |

When flour or starch, sodium chloride (salt) and one of the calcium salts are used as the filler or part of the filler, the preferred ranges of these ingredients are respectively 10 to 15, 14 to 16, and 15 to 20 weight %, based on the total weight of the adjuvant.

In most instances, the weight ratio of the emulsifying agent to the yeast nutrient will be from about 2:1 to about 35:1, preferably from about 5:1 to about 9:1 and the weight ratio of the yeast nutrient to the oxidizing agent will be from about 0.3:1 to about 10,000:1, preferably from about 30:1 to about 70:1.

An adjuvant having the formulation listed below in Table B is particularly effective for producing an increased fermentation rate and a bread having improved uniformity in volume, break and shred and crust characteristics.

TABLE B

| Ingredient | Weight %, Based on Total Weight of Adjuvant |
|---|---|
| Ethoxylated monoglyceride | 16 |
| Mono- and diglycerides (non-ethoxylated) | 24 |
| Ammonium sulfate | 6.25 |
| Potassium bromate | 0.11 |
| Calcium propionate | 9.40 |
| Calcium sulfate | 18.75 |
| Flour or starch | 12.99 |
| Sodium chloride (salt) | 12.50 |
| | 100.00 |

The ingredients of the adjuvant are blended together for a sufficient time to permit the emulsifying agent to physically tie up and at least partially encapsulate the yeast nutrient and the oxidizing agent. The ingredients can be admixed and blended together in any convenient sequence. In order to facilitate a uniform dispersion of the yeast nutrient and the oxidizing agent, it generally is preferred to first admix and blend these two ingredients together in a suitable blending means, such as ribbon blender, e.g., for 1–5 minutes, and then, after adding the emulsifying agent thereto, continue the blending for an additional time so that the yeast nutrient and the oxidizing agent becomes at least partially encapsulated by the emulsifying agent, e.g., 2–15 minutes. When a mold inhibitor and/or a filler is used, these ingredients are preferably added after the basic ingredients of the adjuvant (the emulsifying agent, the yeast nutrient, and the oxidizing agent) have been thoroughly blended together and the resultant admixture is blended for an additional time to obtain a substantially uniform dispersion of all the ingredients, e.g., 1–20 minutes.

It is contemplated that a yeast nutrient/oxidizing agent mixture can be incorporated with the emulsifying agent by blending these ingredients with crude triglyceride oils used for making the emulsifying agent and then hydrogenating the resultant mixture to form a mono- and diglyceride emulsifying agent containing the yeast nutrient and the oxidizing agent therein.

Generally, the amount of adjuvant added either to the starting dough batch of the sponge dough process or the brew of a continuous process is about 0.25 to about 1.5 lbs. preferably about 0.75 to about 1.25 lbs., per 100 lbs. of flour in the final dough. According to this invention, as distinguished from prior processes, the fermentation adjuvant (such as that specifically described in Table B above) is added as a single charge during the initial step of dough or brew mixing, i.e., prior to any substantial fermentation, rather than adding the individual ingredients to the dough in separate steps at a later stage of development, i.e., after substantial fermentation. It has been found that, when the adjuvant of the invention is used in this manner, bread having superior properties is produced even though a fermentation period of only about 2 to 2 ½ hours is used as compared to a standard fermentation period of 4 ½ to 5 hours generally used in conventional bread making processes.

After completion of fermentation, the dough is processed in the usual manner, except additional additives do not have to be added, to produce a final baked product, e.g., mixed with the remaining amounts of flour and water, divided, proofed, moulded, finally proofed and baked.

The storing, handling and incorporation of the adjuvant of the invention into the dough mix can be conveniently accomplished by means of premixed packages which contain either a bulk amount of the adjuvant or an appropriate amount of the adjuvant for the particular size of dough unit being processed. Rather than maintaining bulk amounts of the various additives and scaling the desired amounts for each dough batch, the baker can simply maintain an inventory of these premixed packages. At the time of use either an appropriate amount of adjuvant is removed from a bulk package or an appropriate sized package is opened, and the adjuvant is added to the dough mix as a single charge.

Without further elaboration, it is believed that one skilled in the art can, using the preceding description, utilize the present invention to its fullest extent. The following examples are presented to illustrate the advantages and the improved bread properties provided by the invention and are not to be construed as being limitative of the remainder of the specification and the claims.

EXAMPLE 1

Several master sponge dough samples using different additives were prepared. Scaled amounts of the ingredients used were added to a dough mixer and mixed together therein for about 2 minutes. Each of the resulting master sponge dough samples were then transferred to sponge troughs for fermentation. The temperature of the sponge dough samples at the start of fermentation was about 78°F. Portions of each master sponge were subjected to dough tests described below in Example 2.

Another portion of each master sponge samples, after completion of fermentation, was returned to the dough mixer, the remainder of flour and water and the other remaining dough ingredients were added, and the entire dough system mixed for 4 ½ minutes. The temperature of the dough samples were about 80°F. after mixing. These dough samples were then deposited in a dough trough (holding container) and held therein for a relaxation or floor time of 20 minutes. The dough samples were thereafter handled in the usual manner for making a sponge dough bread, i.e., divided into loaf size, initially proofed, moulded, panned, finally proofed to a template, and then baked at 450°F. for 18 minutes.

The dough samples were made in accordance with the following recipes:

| Ingredient | Parts by Weight per 100 Parts of Flour in Finished Dough | | | | |
|---|---|---|---|---|---|
| | Dough Samples | | | | |
| | 1 | 2 | 3 | 4 | 5 |
| Sponge Stage | | | | | |
| Flour | 70 | 70 | 70 | 70 | 70 |
| Water | 46 | 46 | 46 | 46 | 46 |
| Yeast | 2.5 | 2.5 | 2.5 | 2.5 | 2.5 |
| Yeast food[1] | 0.5 | (a) | (a) | (a) | 0.5 |
| Emulsifier | — | (a) | (c) | (a) | 0.5[k] |
| Calcium propionate | (A) | (a) | — | (a) | 0.25[f] |

—Continued

| Ingredient | Parts by Weight per 100 Parts of Flour in Finished Dough |  |  |  |  |
|---|---|---|---|---|---|
| | Dough Samples | | | | |
| | 1 | 2 | 3 | 4 | 5 |
| Dough Stage | | | | | |
| Flour | 30 | 30 | 30 | 30 | 30 |
| Water | 19 | 19 | 19 | 19 | 19 |
| Salt | 2 | 2 | 2 | 2 | 2 |
| Sugar | 4 | 4 | 4 | 4 | 4 |
| Shortening (non-emulsifying) | 3 | 3 | 3 | 3 | 3 |
| Emulsifier[2] | 0.5 | — | — | — | — |
| Dough conditioner[3] | 0.25 | — | — | — | 0.25 |
| Non-fat milk powder | 2 | 2 | 2 | 2 | 2 |
| Calcium propionate | 0.25 | — | — | — | — |

[1] Arkady yeast food marketed by Standard Brands, Inc., comprised of about 26% sodium chloride, 9% ammonium chloride, 21% calcium sulfate, 40% corn starch, 0.23% potassium bromate, and 4% moisture.

[2] Atmul 50 marketed by Atlas Chemical Co., a mixture of mono- and diglycerides in a lard base.

[3] Paniplus dough conditioner marketed by Paniplus Co., a division of IT & T.

[A] Control Sample 1 - the calcium propionate mold inhibitor, emulsifier and dough conditioner were added separately to and mixed with the fermented sponge dough as is the usual practice in conventional sponge dough processes.

[B] Sample 2 - the yeast food, emulsifier, dough conditioner, and calcium propionate of the Control Sample 1 was replaced with 1 lb. of an adjuvant of the invention which was prepared in accordance with the formulation given in Table B and was added as a single charge along with the flour, water and yeast during mixing of the sponge dough. This adjuvant was prepared by first blending the yeast nutrient (ammonium sulfate) and the oxidizing agent (potassium bromate) together for about 2 minutes, then blending the emulsifier ( a powder-like pre-blended mixture of the non-ethoxylated mono- and diglycerides and ethoxylated monoglycerides) therewith for about 2 minutes, and finally adding the remaining ingredients (calcium sulfate, flour, sodium chloride, and calcium propionate) and blending the resultant mixture for an additional 2 minutes. All blending steps were conducted at room temperature.

[C] Sample 3 - the yeast food, emulsifier and dough conditioner used in control Sample 1 was replaced with 1 lb. of an adjuvant of the invention prepared in the same manner as the adjuvant used in Sample 2 except the calcium propionate mold inhibitor was omitted. Otherwise the relative proportions of the other adjuvant ingredients were the same and the adjuvant was added as a single charge in the same manner as Sample 2.

[D] Sample 4 - the ingredients of the adjuvant used in Sample 2, in the same quantities, were added individually (i.e., without pre-blending) along with the flour, water and yeast during mixing of the sponge dough.

[E] Sample 5 - .25 parts of calcium propionate was blended thoroughly with 0.5 parts of melted Atmul 50 and added along with the flour, water and yeast during mixing of the sponge dough.

EXAMPLE 2

Two 20 gram pieces were taken from each of the master sponge dough samples prepared in Example 1 and measured for carbon dioxide gas production during fermentation in accordance with American Association of Cereal Chemist Standard Procedure 22-11. Measurements were taken at 30 minute intervals over a 4-hour fermentation period. The results from this test are listed below in Table I.

TABLE I

| Sample No. | $CO_2$ Production, Measured as mm Hg after Various Fermentation Periods, min.[1] | | | | | | | |
|---|---|---|---|---|---|---|---|---|
| | 30 | 60 | 90 | 120 | 150 | 180 | 210 | 240 |
| 1 (Control) | 51 | 94 | 112 | 137 | 171 | 208 | 245 | 287 |
| 2 | 69 | 111 | 162 | 234 | 308 | 380 | 440 | 467 |
| 3 | 68 | 107 | 156 | 218 | 285 | 345 | 392 | 407 |
| 4 | 23 | 25 | 51 | 114 | 186 | 262 | 328 | 370 |
| 5 | 52 | 85 | 85 | 97 | 125 | 154 | 183 | 213 |

[1] Average value for test on duplicate pieces

The acidity levels for each of the sponge dough samples of Example 1 during fermentation were measured by taking a 10 gram price from each sample, mixing the piece in 50 ml. of distilled water and measuring the pH of the solution with a pH meter. The pH was measured at 30 minute intervals over a 4-hour fermentation period. The results from this test are listed below in Table II.

TABLE II

| Sample No. | Sponge pH After Various Fermentation Periods, Min. | | | | | | | | |
|---|---|---|---|---|---|---|---|---|---|
| | 0 | 30 | 60 | 90 | 120 | 150 | 180 | 210 | 240 |
| 1 (Control) | 5.52 | 5.30 | 5.20 | 5.15 | 5.10 | 5.02 | 5.02 | 5.15 | 5.02 |
| 2 | 5.28 | 5.12 | 5.12 | 5.00 | 4.90 | 4.91 | 4.85 | 4.83 | 4.85 |
| 3 | 5.50 | 5.27 | 5.22 | 5.00 | 4.82 | 4.70 | 4.62 | 4.62 | 4.62 |
| 4 | 5.40 | 5.10 | 5.12 | 5.02 | 4.90 | 4.90 | 4.80 | 4.88 | 4.90 |
| 5 | 5.32 | 5.17 | 5.12 | 5.10 | 5.07 | 5.03 | 5.02 | 5.02 | 5.10 |

Generally, a fermenting sponge dough is considered to have reached maturity (full rise) when the $CO_2$ gas production rate is in the vicinity of 230 mm Hg and the pH is about 5.00. From the above tests results, it can be seen that dough Samples 2 and 3, both of which employed adjuvants in accordance with the invention, had fermentation rates which were substantially higher than those for any of the other samples. In fact, these two samples were completely matured within 2–2 ½ hours. Quite surprisingly, even though the adjuvant used for Sample 2 included a calcium propionate mold inhibitor, the fermentation rate for this sample was somewhat higher than that for Sample 3 which used an adjuvant not including a mold inhibitor, was substantially higher than that for control Sample 1 which did not include a mold inhibitor in the sponge dough and was even much higher than that for Sample 5 in which the mold inhibitor was incorporated in a melted emulsifier.

Also, it can be seen from these results that a blended mixture of the adjuvant ingredients produces a synergistic effect with respect to fermentation rate, not provided by the individual ingredients themselves when added separately to the process. This effect is dramatically illustrated by comparing the $CO_2$ gas production rates for Sample 2 (pre-blended adjuvant of the invention) and Sample 4 (same ingredients and amounts as Sample 2, except added to process individually.

The significantly increased fermentation rate provided by the adjuvant of the invention permits the baker to either reduce the fermentation period or the amount of yeast used. Either of these alternatives represent a significant cost savings.

EXAMPLE 3

Three loaves from each of the samples prepared in Example 1 were scored for both internal and external quality characteristics on the day after baking. The baked products produced from Samples 2 and 3 had a break and shred and a crust which was superior to the products produced from the other samples. For instance, the break and shred of the bread made from control Sample 1 was quite ragged whereas the loaves of bread made from Samples 2 and 3 had a uniform break and shred along the entire length. The break and shred for bread made from Sample 4 had substantial variations in width and the break and shred for bread made from Sample 5 was very ragged. The crust of the bread made from Control Sample 1 had several blotches and was wrinkled whereas the crust of the bread made from Samples 2 and 3 was very smooth and shiny and had a golden bloom. The specific volume, in cubic inches per ounce, for Samples 2 and 3 was 10.10 and 10.26, respectively, compared to 10.06 for Control Sample 1. Thus, the porosity of the bread made with the two adjuvants of the invention was quite comparable with the bread made by the conventional process.

EXAMPLE 4

Loaves of bread made from each of the dough samples prepared in Example 1 were allowed to cool at room temperature for 60 minutes after baking and then sealed in polyethylene bags. The thus-packaged bread loaves were stored for 24 and 48 hours after which time each loaf was sliced into 5 equal parts in a miter box and the crumb softness determined with a Hansaloy Bread Softness Penetrometer. The results from this test are listed below in Table III.

TABLE III

| Sample No. | Average Penetration Value[1] | |
|---|---|---|
| | After 24 Hours Storage | After 48 Hours Storage |
| 1 | 7.8 | 6.9 |
| 2 | 7.7 | 6.9 |
| 3 | 7.8 | 6.9 |
| 4 | 7.6 | 7.3 |
| 5 | 8.0 | 7.3 |

[1]Average of 5 values for each loaf. Higher values indicate softer bread.

From the results of this test, it can be seen that adjuvants of the invention does not adversely affect the quality of the bread.

EXAMPLE 5

Adjuvants according to the invention were prepared in the same manner as the adjuvant used for Sample 2 in Example 1, except in separate adjuvants, the potassium bromate was replaced with an equal amount of potassium iodate, azodicarbonamide, and L-ascorbic acid, respectively. These adjuvants were used to prepared sponge dough samples containing 454 grams flour, 281 grams water, 11 grams yeast and 4.54 grams of the adjuvant. A control sponge dough sample was prepared containing 454 grams flour, 281 grams water, 11 grams yeast, 2.25 grams Arkady yeast food, and 1.1 grams calcium propionate. The $CO_2$ gas production of all of the sponge dough samples during fermentation was measured in the same manner as described in Example 2. The sponge dough samples were at a temperature of 78°F. at the start of fermentation and the temperature thereof increased to 82°F. after 5 hours of fermentation. It was found that the sponge dough samples made from the adjuvants of the invention had a substantially higher rate of $CO_2$ gas production than the control sample and, like Sample 2 in Example 2, were fully matured after 2–2 ½ hours of fermentation.

EXAMPLE 6

Adjuvants according to the invention were prepared in the same manner as the adjuvant used for Sample 3 in Example 1, except in separate adjuvants, the potassium bromate was replaced with an equal amount of potassium iodate, azodicarbonamide, and L-ascorbic acid, respectively. These adjuvants were used to prepare sponge dough samples containing 454 grams flour, 281 grams water, 11 grams yeast and 2.10 grams of the adjuvant. A control sponge dough sample was prepared containing 454 grams flour, 281 grams water, 11 grams yeast and 2.25 grams Arkady yeast food. The $CO_2$ gas production of all of the sponge dough sample during fermentation was measured in the same manner as that described in Example 2. The sponge dough samples were at a temperature of 78°F. at the start of fermentation and the temperatures thereof increased to 82°F. after 5 hours of fermentation. It was found that the sponge dough sample made from the adjuvants of the invention generally had a higher rate of $CO_2$ gas production than the control sample and, like Sample 3 in Example 2, were fully matured after 2–2 ½ hours of fermentation.

EXAMPLE 7

Bread was prepared by a conventional sponge dough process using the following recipe for making the dough.

| Ingredient | Amount per 100 lbs. of Flour in Finished Dough |
|---|---|
| Sponge Stage | |
| Wheat Flour | 70 lbs. |
| Water | 46 lbs. |
| Yeast | 2 lbs. |
| Yeast food[1] | 9 oz. |
| Fungal enzymes[2] | 2 tablets |
| Vitamin enrichment[3] | 1 tablet |
| Dough Stage | |
| Wheat flour | 30 lbs. |
| Water | 19 lbs. |
| Sodium chloride (salt) | 2 lbs. |
| Sugar | 6 lbs. |
| Dough conditioner[4] | 5 oz. |
| Calcium-stearyl-2-lactate | 6 oz. |
| Calcium propionate | 3 oz. |
| Emulsifier[5] | 5 oz. |
| Shortening (non-emulsifying) | 3 lbs. |
| Milk powder | 3 lbs. |

[1]Fleischmann's Fermaloid yeast food, comprised of about 19% sodium chloride, .7% calcium sulfate, 0.1% potassium bromate, 24% flour or starch, 48% mono-calcium phosphate, 0.1% potassium iodate, and 7% ammonium sulfate.
[2]Proflex fungal enzymes marketed by Food Industries Division of Pennwalt.
[3]Fleischmann's vitamin enrichment tablet.
[4]Paniplus dough conditioner marketed by Paniplus Company, composed of about .3% sodium chloride, 0.05% ammonium phosphate, 3% dicalcium phosphate, 0.6% calcium peroxide and 95% soya flour.
[5]Atmul 500 marketed by Attas Chemical Co., a mixture of mono- and diglycerides in a lard base.

The sponge dough was prepared by depositing scaled amounts of the flour, water, yeast and yeast food in a dough mixer. The fungal enzyme tablets and the vitamin enrichment tablet were each dissolved in separate 1 quart quantity of water and then added to the mixer. The sponge dough ingredients were then mixed together for 4 minutes and the resultant sponge dough was transferred to a sponge trough and allowed to ferment for 5 hours. The temperature of the sponge dough at the onset of fermentation was 73°F. and increased to 81°F. during the 5-hour fermentation period.

The fermented sponge was then placed in a mixer and the remainder of the flour and water and the other dough stage ingredients were added thereto. The entire ingredient system was then mixed for 13 minutes. The temperature of the dough after mixing was 80°F. The dough was then deposited in a dough trough and held therein for a floor time of 30 minutes. The dough was thereafter handled in the usual manner for making sponge dough bread, i.e., divided in to loaf size, initially proofed, moulded, panned, finally proofed, and baked. The final proofing period was 63 minutes.

Bread was prepared in the same general manner as described above, except the yeast food, fungal enzyme tablets, dough conditioner, calcium stearyl-2-lactate, emulsifier and calcium propionate mold inhibitor were replaced with 1 lb. of an adjuvant of the invention prepared in the same manner as the adjuvant used for Sample 2 in Example 1.

The formulation of the dough containing the adjuvant of the invention was as follows:

| Ingredient | Amount per 100 lbs. of Flour in Finished Dough, lbs. |
|---|---|
| Sponge Stage | |
| Wheat flour | 70 |
| Water | 46 |
| Yeast | 2 |
| Adjuvant | 1 |
| Vitamin enrichment | 1 tablet |
| Dough Stage | |
| Wheat flour | 30 |
| Water | 21 |
| Sodium chloride (salt | 2 |
| Sugar | 6 |
| Shortening (non-emulsifying) | 3 |
| Milk powder | 3 |

The sponge dough was prepared by depositing scaled amounts of the flour, water, yeast and adjuvant in a dough mixer. The vitamin enrichment tablet was dissolved in 1 quart of water and then added to the mixer and the sponge dough ingredients were then mixed together for 4 minutes. The resultant sponge dough was transferred to sponge trough and allowed to ferment. The temperature of the sponge dough was 74°F. The fermenting sponge dough was observed at 30 minute intervals and was noted to be rising at an accelerated rate. After 2 ½ hours of fermentation the sponge dough was considered to be fully matured and was at a temperature of 80°F. At that time, the sponge dough was returned to the dough mixer and the remaining flour and water and the salt, sugar, shortening and milk powder were added thereto and the entire ingredient system was mixed. It was noted that the dough was somewhat stiffer than that made by the conventional process so 2 lbs. of additional water was added to facilitate mixing. This indicates that the dough had a capacity to absorb more water and, hence, the capability of providing a higher product yield.

During the mixing it was noted that the dough "cleaned-up" quicker and was completely mixed in 10 minutes rather than the 13 minutes required for the dough produced by the conventional process. The temperature of the dough after this mixing time was 80°F.

The dough was thereafter processed in the same manner as in the above conventional process to produce loaves of baked bread. The loaves prepared by the adjuvant of the invention were fully proofed in 47 minutes in comparison to the 6 minutes required for the loaves prepared by the conventional process.

From a comparison of the final baked products, it was found that the bread made with the adjuvant of the invention exhibited superior uniformity in volume and break and shred. The break and shred of the bread much by the conventional process was very ragged, while the bread made in accordance with the invention had a uniform break and shred of about 1 ½ inches along the entire length of the loaf. The crust of the bread made by the conventional process had several blotch marks and was wrinkled while the crust of the bread made in accordance with the invention was very smooth and shiny and had a golden brown bloom.

Similar results have been obtained when an adjuvant of the invention is added to the brew of the conventional continuous bread-making processes. It has been found that acceptable mold inhibition is provided by an adjuvant of the invention even though smaller than normal amounts of the mold inhibitor are used.

Although not fully understood, it is believed the increased rate of fermentation provided by the adjuvant of the invention is at least partially the result of the yeast nutrient and the oxidizing agent being encapsulated by the emulsifying agent. This encapsulation apparently delays the total consumption of the yeast nutrient and the oxidizing agent, thereby providing a slow release of these vital ingredients to the dough mass. Thus, a continuing supply of yeast nutrient and oxidation is apparently provided throughout the fermentation period, causing a more vigorous yeast gassing and growth activity which in turn accelerates fermentation maturity. On the other hand, when conventional yeast foods are used, the yeast nutrient and oxidants therein are apparently consumed within a relatively short period of time, causing the dough to be starved for these functions during the latter stages of fermentation. The controlled release of the yeast nutrient and the oxidizing agent apparently also accounts for the decreased final proofing time and the increased oven-spring exhibited by loaves prepared with adjuvants of the invention.

Protected, active dry yeasts have been developed recently. It is contemplated that such yeasts, in the amount required for dough formation, can be included in the adjuvant of the invention. Also, as mentioned above, the adjuvant can include various enrichment additives, much as the vitamin enrichment identified above. The inclusion of both the yeast and enrichment additives in the adjuvant will further add to the desirability for using the adjuvant of the invention in bread formulas. Hence, in addition to having an advantageous application in the commercial baking field, the adjuvant of the invention can be included in complete bread and roll mixes sold to housewives and home bakers.

From the above description, it can be appreciated that the adjuvant of the invention provides accelerated fermentation without the need for other additives, such as enzymes, L-cystine and organic acids, which have been developed to artificially mature the dough. The yeast is stimulated so that its own natural enzymes and zymase bleaches and matures the dough. Therefore, the need for artificial enzymes, bleaching agents and maturing acid compounds is eliminated.

From the foregoing description, one skilled in the art can easily ascertain the essential characteristics of the invention, and without departing from the spirit and scope thereof, can make various changes and modifications of the invention to adapt it to various usages and conditions.

What is claimed is:

1. An adjuvant for addition to a yeast leavened dough mixture, which adjuvant permits a substantial reduction in the fermentation time of the dough mixture, comprising a dry blended mixture including 0.025 to 10 weight % of an ammonium salt capable of acting as a yeast nutrient, 0.001 to 0.75 weight % of an oxidizing agent selected from the group consisting of potassium bromate, potassium iodate, calcium bromate, calcium iodate, ammonium persulfate, L-ascorbic acid, azocarbonamide and mixtures thereof, and 10 to 90 weight % of a glyceride emulsifying agent capable of at least partially encapsulating said yeast nutrient and said oxidizing agent when dry blended therewith.

2. An adjuvant according to claim 1 further including 0 to 20 weight % of a mold inhibitor selected from the group consisting of calcium propionate, sodium propionate and mixtures thereof, and 0 to 85 weight % of a filler selected from the group consisting of flour, starch, sodium sulfate, sodium chloride, calcium phosphates, calcium lactate, calcium carbonate, calcium orthophosphates, and mixtures thereof.

3. An adjuvant according to claim 2 wherein said emulsifying agent is a glyceride emulsifier selected from the group consisting of non-ethoxylated mono- and diglycerides, ethoxylated monoglycerides and mixtures thereof.

4. An adjuvant according to claim 3 wherein said yeast nutrient is selected from the group consisting of ammonium chloride, ammonium sulfate, mono- ammonium phosphate, di-ammonium phosphate and mixtures thereof.

5. An adjuvant according to claim 4 wherein the weight percents of said yeast nutrient, said oxidizing agent, said emulsifying agent, said mold inhibitor and said filler are 5 to 7, 0.10 to 0.15, 35 to 45, 5 to 10, and 30 to 48, respectively, based on the total weight of said adjuvant.

6. An adjuvant according to claim 5 wherein said emulsifying agent is a mixture of powder-like non-ethoxylated mono- and diglycerides and ethoxylated monoglycerides containing about 40 weight % oxyethylated monoglycerides, with ethylene oxide comprising about 50% by weight thereof, and about 60 weight % of a mixture of non-ethoxylated mono- and diglycerides.

7. In a method for making yeast leavened bread from flour wherein bread dough is formed by admixing bread making ingredients including yeast, flour and water in one or more steps and the finished dough is subsequently proofed and baked to form bread, the improvement comprising adding, as part of the initial mixing step, an adjuvant comprising a dry blended mixture including 0.025 to 10 weight % of a yeast nutrient selected from the group consisting of ammonium chloride, ammonium sulfate, mono-ammonium phosphate, di-ammonium phosphate and mixtures thereof, 0.001 to 0.75 weight % of an oxidizing agent selected from the group consisting of potassium bromate, potassium iodate, calcium bromate, calcium iodate, ammonium persulfate, L-ascorbic acid, azocarbonamide and mixtures thereof, and 10 to 90 weight % of a glyceride emulsifying agent capable of at least partially encapsulating said yeast nutrient and said oxidizing agent when dry blended therewith, the amount of said adjuvant added being within the range of about 0.25 to about 1.5 lbs. per 100 lbs. flour in the final dough.

8. A method according to claim 7 wherein said adjuvant further includes 0 to 20 weight % of a mold inhibitor selected from the group consisting of calcium propionate, sodium propionate and mixtures thereof, and 0 to 85 weight % of a filler selected from the group consisting of flour, starch, sodium sulfate, sodium chloride, calcium phosphate, calcium lactate, calcium carbonate, calcium orthophosphates, and mixtures thereof.

9. A method according to claim 8 wherein the amount of said adjuvant added is within the range of about 0.75 to about 1.25 lbs. per 100 lbs. of flour in the final dough.

10. A method according to claim 9 wherein said emulsifying agent is a glyceride emulsifier selected from the group consisting of non-ethoxylated mono- and diglycerides, ethoxylated monoglycerides and mixtures thereof.

11. A method according to claim 10 wherein the weight percent of said yeast nutrient, said oxidizing agent, said emulsifying agent, said mold inhibitor, and said filler in said adjuvant are 5 to 7, 0.10 to 0.15, 35 to 45, 5 to 10, and 30 to 48, respectively, based on the total weight of said adjuvant.

12. A method according to claim 11 wherein said emulsifying agent is a mixture of powder-like non-ethoxylated mono- and diglycerides and ethoxylated monoglycerides containing about 40 weight % of oxyethylated monoglycerides, with ethylene oxide comprising about 50% by weight thereof, and about 60 weight % of a mixture of non-ethoxylated mono- and diglycerides.

13. A method for making an adjuvant for addition to a yeast leavened dough mixture, which adjuvant is capable of providing a substantial reduction in the fermentation time of the dough mixture, comprising the steps of: dry blending an ammonium salt capable of acting as a yeast nutrient with an oxidizing agent selected from the group consisting of potassium bromate, potassium iodate, calcium bromate, calcium iodate, ammonium persulfate, L-ascorbic acid, azorcarbonamide and mixtures thereof, and a solid, glyceride emulsifying agent for a sufficient time for said emulsifying agent to at least partially encapsulate said yeast nutrient and said oxidizing agent, the amounts of said yeast nutrient, said oxidizing agent and said emulsifying agent being within the respective ranges 0.025 to 10 weight %, 0.001 to 0.7 weight %, and 10 to 90 weight %, based on the total weight of said blend.

14. A method according to claim 13 including dry blending 5 to 10 weight % of a mold inhibitor selected from the group consisting of calcium propionate, sodium propionate and mixtures thereof and 0 to 85 weight % of a filler selected from the group consisting of flour, starch, sodium sulfate, sodium chloride, calcium phosphates, calcium lactate, calcium carbonate, calcium orthophosphates, and mixtures thereof with said blend.

15. An adjuvant for addition to a yeast leavened dough mixture comprising a dry blended mixture of 35 to 45 weight % of a powder-like glyceride emulsifying agent selected from the group consisting of non-ethoxylated mono- and diglycerides, ethoxylated monoglycerides, and mixtures thereof, 5 to 7 weight % of a yeast nutrient selected from the group consisting of ammonium chloride, ammonium sulfate, mono-ammonium phosphate, di-ammonium phosphate, and mixtures thereof, 0.1 to 0.15 weight % of an oxidizing agent selected from the group consisting of potassium bromate, potassium selected from the group consisting of potassium bromate, potassium iodate, calcium bromate, calcium iodate, ammonium persulfate, L-ascorbic acid, azocarbonamide, and mixtures thereof, 5 to 10 weight % of a mold inhibitor selected from the group consisting of calcium propionate, sodium propionate, and mixtures thereof, 10 to 15 weight % of flour or starch, 14 to 16 weight % sodium chloride, and 15 to 20 weight % of a filler selected from the group consisting of sodium sulfate, calcium phosphates, calcium lactate, calcium carbonate, calcium orthophosphates, and mixtures thereof.

16. A method according to claim 15 wherein said emulsifying agent is in powder-like form and is selected from the group consisting of non-ethoxylated mono- and diglycerides, ethoxylated monoglycerides and mixtures thereof.

* * * * *